E. J. LOOMIS & J. I. WOGLUM.
HAY TEDDER.
APPLICATION FILED APR. 21, 1908.

919,045.

Patented Apr. 20, 1909.
2 SHEETS—SHEET 1.

WITNESSES.

INVENTORS.
E. J. Loomis
James I. Woglum
By Howard P. Denison
ATTORNEY.

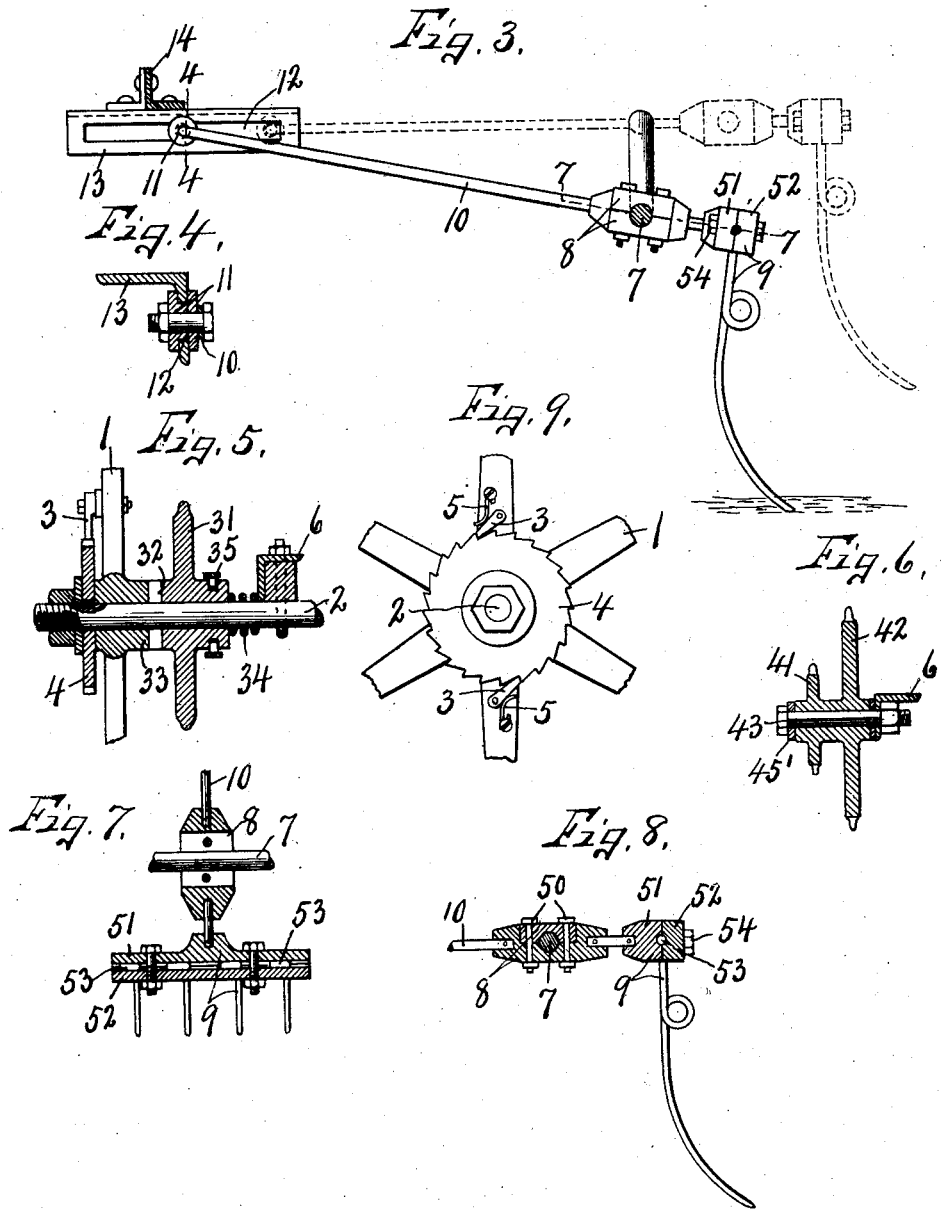

UNITED STATES PATENT OFFICE.

EUGENE J. LOOMIS AND JAMES I. WOGLUM, OF SHERRILL, NEW YORK.

HAY-TEDDER.

No. 919,045.      Specification of Letters Patent.      Patented April 20, 1909.

Application filed April 21, 1908. Serial No. 428,460.

*To all whom it may concern:*

Be it known that we, EUGENE J. LOOMIS and JAMES I. WOGLUM, of Sherrill, in the county of Oneida, in the State of New York, have invented new and useful Improvements in Hay-Tedders, of which the following, taken in connection with the accompanying drawings, is a full, clear, and exact description.

This invention relates to certain improvements in hay tedders adapted to be attached to the rear of mowing machines or to be drawn directly by horse power.

My main object is to simplify the general structure of the machine and at the same time to increase its efficiency particularly in the lifting and spreading action of the forks upon hay or other material which it may be desired to spread.

Another object is to enable the machine to be attached directly to the rear end of a mowing machine so that the hay may be spread for drying immediately upon cutting, all accomplished by the same power.

A further object is to mount the tedder forks upon the rear ends of a vertically rocking frame which is pivoted coaxially with the traction wheels, and to provide suitable adjusting means therefor whereby the tedder forks may be elevated or depressed by the operator while the machine is in action.

A still further object is to provide means for readily connecting and disconnecting the fork operating shaft with and from one of the traction wheels.

Another object is to connect one or both of the traction wheels to the supporting shaft in such manner that it is free to rotate in one direction and to automatically lock itself to the shaft when operated in the opposite direction as for instance in drawing the vehicle forwardly.

Other objects and uses relating to specific parts of the machine will be brought out in the following description.

Figure 1:
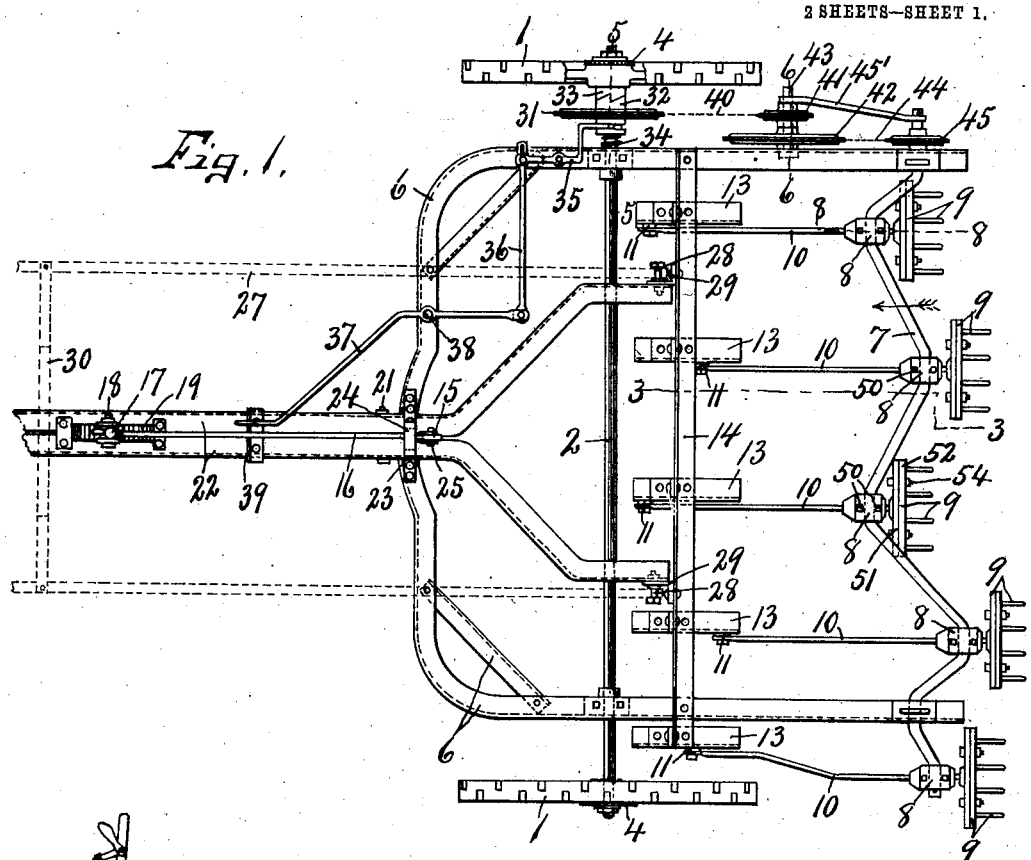
Figure 2:
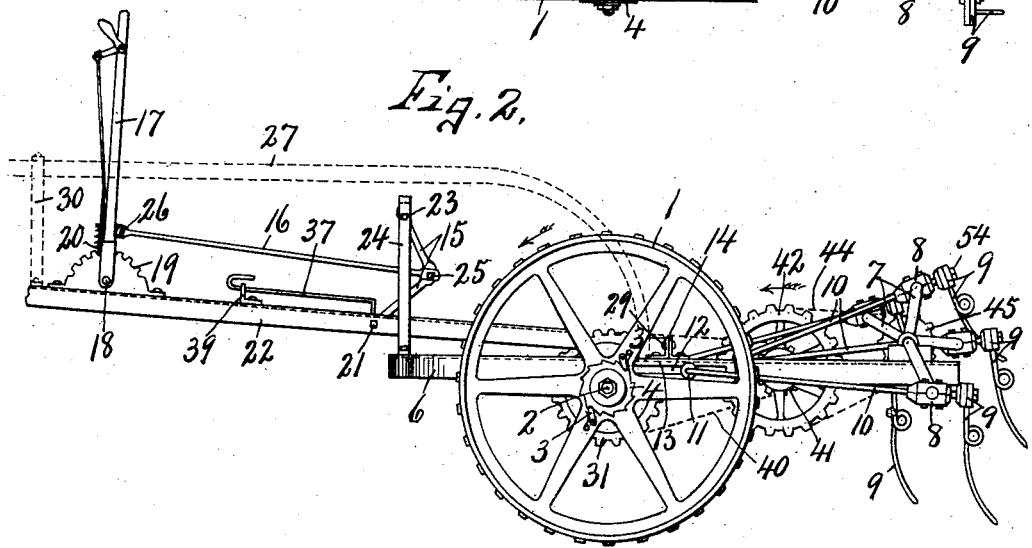

In the drawings—Figures 1 and 2 are respectively a top plan and a side elevation of a hay tedder embodying the various features of my invention. Figs. 3, 4, 5, 6, 7, and 8 are sectional views taken respectively on lines 3—3, Fig. 1, 4—4, Fig. 3, 5—5 and 6—6, Fig. 1, 7—7, Fig. 3 and 8—8, Fig. 1; Figs. 5, 6 and 8 being enlarged. Fig. 9 is an end view of a portion of one of the traction wheels and ratchet and pawl connections with the supporting shaft for said traction wheel.

In carrying out the objects stated, a pair of traction wheels —1— are loosely mounted upon the horizontal ends of the supporting shaft —2— and are provided with diametrically opposite pawls —3— which are spring-pressed into engagement with the ratchet wheels —4— by suitable springs —5— as best seen in Fig. 9, the ratchet wheel —4— being keyed or otherwise rigidly secured to the main shaft —2—.

The pawls —3— and ratchet wheels —4— are arranged so as to rotate the shaft —2— as the machine is drawn forwardly and to permit the wheels to rotate freely in the opposite direction without operating the shaft —2— when the machine is turned from a tangent as in turning corners or propelling the machine backward.

A U-shape frame bar —6— is loosely journaled intermediate its ends upon the shaft —2— and, therefore, extends some distance forwardly and rearwardly of the shaft, its closed end being preferably at the front of the shaft while the rear ends extend some distance beyond said shaft and are mounted upon suitable bearings in which is journaled the opposite ends of a crank shaft —7—. The opposite ends of this crank shaft —7— are coaxial but the intermediate portions are deflected at intervals from the axis forming a series of in this instance five crank arms arranged at different radial angles of in this instance a fifth of a circle, one in advance of the other.

Journaled upon each crank arm is a split bearing —8— carrying at its rear end a tedder fork —9— while its front end is connected by a rod —10— to a cross head consisting in this instance of a roller —11— which is guided in a slot —12— of a suitable supporting guide —13— as best seen in Fig. 3, there being one of these guides —13— for each of the tedder forks. These guides are rigidly secured to the under side of a cross bar —14— which extends transversely of the machine parallel with the shaft —2— and has its opposite ends secured to the opposite arms of the U-shape frame-bar —6—.

The U-shape bar —6—, guides —13— and cross bar —14— constitute the main supporting frame for the crank shaft which operates the tedder forks and is tiltable vertically on its swinging axis which is coaxial with the shaft —2— to adjust the tedder forks toward and from the ground as may be desired. The means for effecting this adjustment preferably consists of a toggle lever —15—, a link —16— and a lever —17—, the latter being fulcrumed at —18— at the axis of a concentric toothed rack —19— and is provided with a pawl —20— adapted to be operated by hand into and out of engagement with the teeth of the rack —19— to lock the tilting frame —6— and tedder forks carried thereby. These toggle arms are disposed in a vertical position, the lower one being pivoted at —21— to a pole or tongue —22— while the upper toggle arm is pivoted at —23— to an upright supporting standard —24— rising from and secured to the frame —6—.

The link —16— is disposed in nearly a horizontal plane and is pivotally connected at —25— to the connecting joint of the toggle arms while the front end of said link —16— is pivoted at —26— to the lever —17— above its fulcrum —18—. It is now evident that by operating the lever —17— back and forth thereby flexing the toggle —15—, the tilting frame —6— will be tilted upon its swinging axis more or less according to the throw of the lever —17—, it being understood that the upright standard —24— to which one end of the toggle is connected is rigidly secured to the front end of the frame —6— some distance in front of the shaft —2— so that the operation of tilting the frame is comparatively easy.

The pole or toggle —22— may be attached by any suitable means to the rear end of the mowing machine or may be attached in the usual manner to the harness of a team of horses.

In some instances a single horse may be used as a means for propelling the machine and for this purpose I have shown in dotted lines a pair of thills —27— as having their rear ends attached to suitable coupling pins —28— which also form the coupling pins for the pole —22—. These coupling pins are mounted upon suitable brackets —29— which are secured to the cross bar —14— equi-distant from opposite sides of the longitudinal center of the machine as best seen in Fig. 1.

The thills —27— may be attached to the machine without removing the pole —22— and in this case said thills are preferably elevated some distance above the pole and are provided with a pendent cross bar —30— secured in a suitable manner to, and resting upon the pole —22—.

The crank shaft —7— carrying the tedder forks —9— is adapted to be driven indirectly from one of the traction wheels —1— but is also adapted to be connected to and disconnected from said traction wheels so that the entire machine may be propelled without operating the tedder forks and for this purpose a sprocket wheel —31— is loosely mounted upon the main shaft —2— and is provided with a clutch section —33—, the latter being formed upon the contiguous face of the adjacent traction wheel —1—.

The sprocket wheel —31— and clutch section —32— are movable axially on the shaft —2— by means of a spring —34— which holds the clutch sections in operative engagement with each other to a lever —35— which is connected to a curved hub on the inner end of the sprocket wheel —32— to throw the clutch section out of engagement with the clutch section —33— against the action of the spring —34— when it is desired to disconnect the crank shaft —7— from its driving mechanism. This clutch operating lever —35— is connected by a link —36— to a hand lever —37—, the latter being fulcrumed at —38— intermediate its ends to the front part of the tilting frame —6— and has its front end extending some distance beyond said frame and movable into and out of engagement with a suitable stop or rack —39— for holding the axially movable clutch section —32— in its adjusted position.

The sprocket wheel —31— is connected by a link belt —40— to a somewhat smaller sprocket wheel —41— which in turn is coaxial with and rigidly secured to a somewhat larger sprocket wheel —42—, said sprocket wheels —41— and —42— being mounted upon a supporting spindle —43— projecting from the adjacent side of the main frame —46—.

The sprocket wheel —42— is connected by a link belt —44— to a somewhat smaller sprocket wheel —45— which is rigidly secured upon the adjacent end of the crank shaft —7—, the latter being connected by a brace bar —45′— to the outer end of the stud or spindle —43— to brace the latter against undue strains.

The guides —13— for the tedder operating arms —10— are rigidly secured to the under side of the frame bar —14— as best seen in Fig. 3 and are preferably disposed in a horizontal position in nearly the same horizontal plane as the axis of revolution of the crank shaft —7—, the length of the slot —12— in each of the guides being equal to or slightly greater than the throw of the crank arm to which its corresponding tedder fork is connected.

As best seen in Fig. 4, the roller cross head —11— has a central reduced annular bearing riding in the slot —12— and is provided with inner and outer annular flanges for engaging the inner and outer faces of the guide —13— and preventing lateral displacement of a roller cross head relative to the guide, said roller being supported upon a suitable pin forming a part of the connecting rod.

As best seen in Fig. 8, the bearings —8— to which the connecting rod —10— and tedder forks are secured is made in two parts fitting upon the sides of its corresponding crank arm and clamped together by suitable bolts —50— which enables the tedder forks to be readily connected to and disconnected from the crank shaft. In like manner, one of the flanges of the roller cross head —11— is removable to permit the roller to be readily inserted into or removed from the slot —12—. In like manner, each tedder fork is composed of a number of teeth which are held between two clamping plates or bars —51— and —52— having grooves in their adjacent faces for receiving offset ends —53— on the upper end of the tines of the forks, said plates being clamped together by suitable bolts —54— as best seen in Figs. 1, 3, and 8.

It will be seen from the foregoing description that the frame —6— together with the crank shaft and tedder forks and guides for the connecting rods are tiltable vertically upon the main shaft by means of the toggle —15— and connections with the lever —17— so that the entire series of tedder forks may be elevated or depressed at will to any degree. It will also be observed that the crank shaft for operating the tedder forks may be thrown out of connection with the traction wheel by simply disengaging the clutch section —32— from the clutch sections —33— by means of the shifting lever —37—.

Another important feature of my invention is to provide the guides —13— and cross heads slidable therein and connected to the tedder forks whereby the lower ends of the tedder forks are thrown rearwardly during their elevation thus exerting a great lifting or distributing power upon the hay or similar material and engaged thereby serving to spread the hay out over the ground more evenly than would be the case if the forks remained in the same vertical position while being carried rearwardly and upwardly.

It is evident, however, although the construction is particularly simple and effective, some change may be made in the detail of construction without departing from the spirit of this invention.

What we claim is:

1. In a hay tedder, a main shaft, and traction wheels thereon, a tilting frame on the shaft, means for tilting the frame, a guide on the frame, a crank shaft journaled in the frame, a bearing mounted on a crank of said shaft, a tedder fork carried by said bearing, a cross head on the guide and a connecting rod between said bearing and cross head, and means for transmitting motion from one of the traction wheels to the crank shaft.

2. In a hay tedder, a vertically tiltable frame, and means for tilting the same, guides on the frame, cross heads movable lengthwise of the guides, a crank shaft on the frame, tedder forks connected to the cranks of said shaft and also connected to said cross heads, and means for rotating the crank shaft.

3. In a hay tedder, a main shaft and traction wheels loose thereon, means for transmitting rotary motion from the traction wheels to the shaft when the traction wheels are rotated in one direction, said traction wheels being free to rotate in the opposite direction, a vertically tiltable frame journaled on the main shaft, means for tilting the frame, a crank shaft journaled on the rear end of the frame, bearings on the cranks of said shaft, tedder forks connected to said bearings, guides on the frame, cross heads movable in the guides, and connecting rods between the cross heads and bearings.

4. In a hay tedder, a rotary crank shaft, and actuating means therefor, a sliding cross head and guide therefor, a bearing mounted upon a crank of the crank shaft, a tedder fork supported by said bearing, and a connecting rod between the cross head and said bearing.

5. In a hay tedder, a crank shaft and driving means therefor, a slotted guide, a roller cross head movable in said guide, a bearing mounted upon a crank of the crank shaft, a tedder fork carried by said bearing, and a connecting rod between said bearing and roller cross head.

In witness whereof we have hereunto set our hands this 13th day of April 1908.

EUGENE J. LOOMIS.
JAMES I. WOGLUM.

Witnesses:
H. E. CHASE,
C. M. McCORMACK.